United States Patent
Mayersak

(10) Patent No.: US 6,339,396 B1
(45) Date of Patent: Jan. 15, 2002

(54) LOCATION OF THE RADIO FREQUENCY EMITTING TARGETS

(75) Inventor: Joseph R. Mayersak, Ashburn, VA (US)

(73) Assignee: Lockheed Martin Corp, Bethesda, MD (US)

( * ) Notice: Subject to any disclaimer, the term of this patent is extended or adjusted under 35 U.S.C. 154(b) by 0 days.

(21) Appl. No.: 09/505,796

(22) Filed: Feb. 17, 2000

(51) Int. Cl.$^7$ ................................................. G01S 3/02
(52) U.S. Cl. ................................. 342/357.05; 342/358
(58) Field of Search ................... 342/357.05, 357.08, 342/357.13, 357.14, 358, 357.06

(56) References Cited

U.S. PATENT DOCUMENTS 5,432,520 A * 7/1995 Schneider et al. .......... 342/357
6,232,922 B1 * 5/2001 McIntosh .................... 342/453

* cited by examiner

Primary Examiner—Mark Hellner
(74) Attorney, Agent, or Firm—Charles E. Temko

(57) ABSTRACT

A method is described which enables the location of a radio frequency emitting target in absolute or relative GPS coordinates from a single airborne platform within a few seconds. The method uses a signal processing technique which emulates an antenna moving at very high velocities to induce a Virtual Doppler shift on signals incident upon a linear antenna array. The Virtual Doppler shift is directly proportional to the signal direction of arrival as measured by its direction cosine. The method is shown to prevent single and multiple GPS jammers from being able to jam conventional GPS signals. Also disclosed is a means and method for developing virtual Doppler shifted signals to determine the angle-angle bearing of emitting targets to high resolution. This in turn, allows the position of the emitter to be determined in a GPS reference frame to be located to a high degree of accuracy from a single platform in extremely short times. The ultra-high precision direction-find capability requires the ability to determine the direction cosines of GPS satellite signals incident upon the detecting air vehicle and provides GPS anti-jam capability as a derivative of the definition of the direction finding.

12 Claims, 23 Drawing Sheets

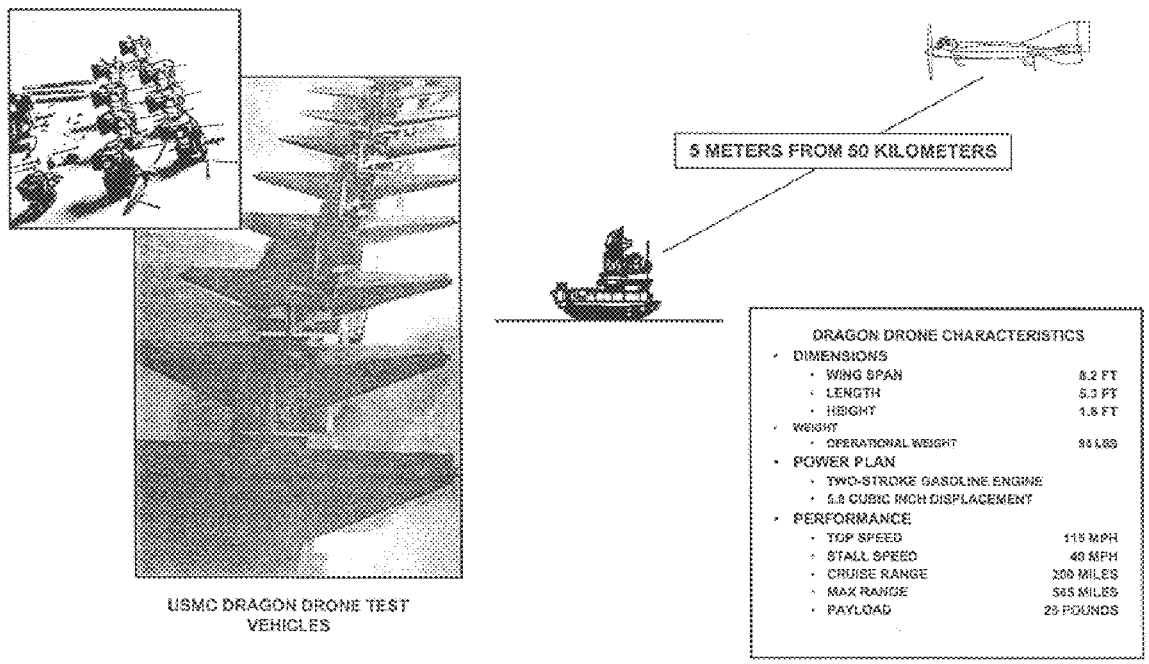
FIGURE 1. VIRTUAL DOPPLER CONCEPTS

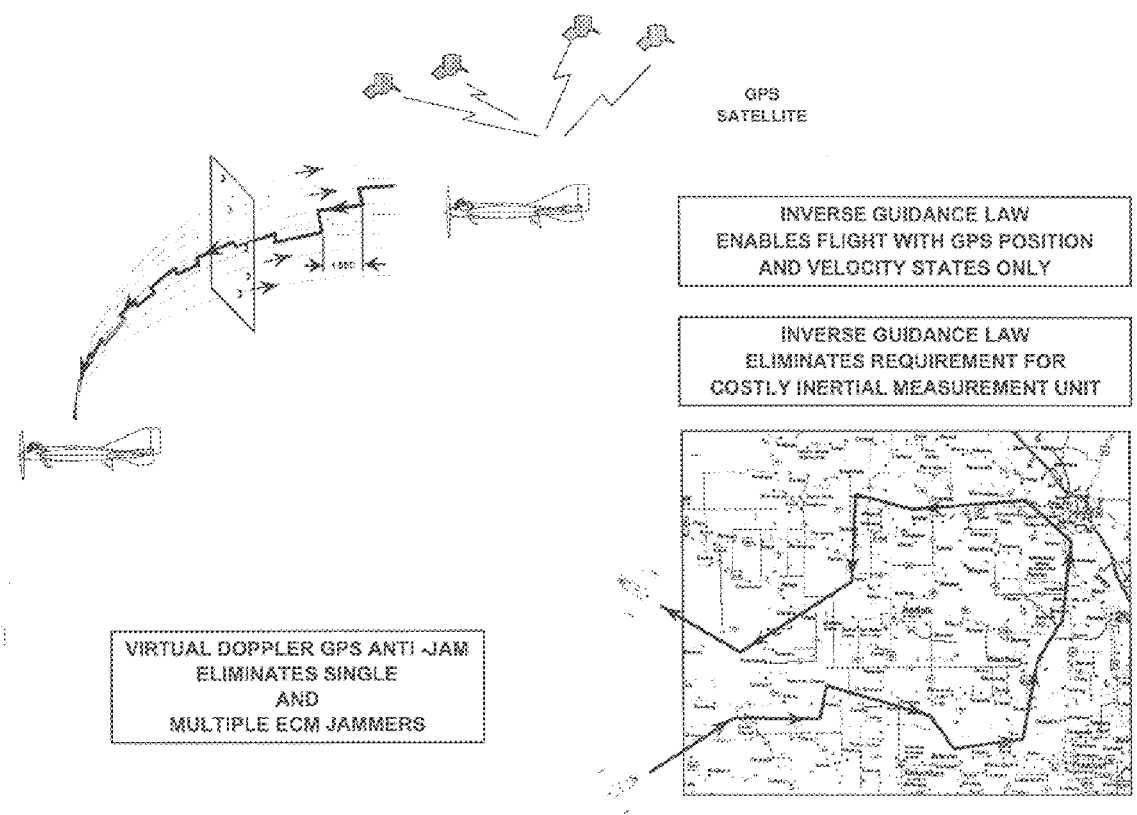
FIGURE 2. DRAGON DRONE GUIDANCE

| GPS ERROR BUDGET FOR POSITION ACCURACY | STANDARD GPS 1σ STANDARD DEVIATION | RELATIVE FRAME GPS 1σ STANDARD DEVIATION |
|---|---|---|
| SPACE VEHICLE CLOCK ERRORS | 1.0 | 0.0 |
| EPHEMERIS ERRORS | 8.6 | 0.0 |
| IONOSPHERIC DELAY ERRORS | 1.3 | 0.5 |
| TROPSPHERIC DELAY ERRORS | 1.3 | 0.1 |
| RECEIVER NOISE/QUANTIZATION ERRORS | 0.8 | 0.8 |
| RECEIVER INTERCHANNEL BIAS | 0.5 | 0.5 |
| MULTIPATH | 4.0 | 4.0 |
| USER EQUIVALENT RMS RANGING ERROR | 13.9 | 4.2 |
| RESULTING HDOP HORIZONTAL ACCURACY (2-D/1-σ) | 21.0 | 6.3 |
| RESULTING HORIZONTAL CEP -- FEET | 17.5 | 5.2 |
| RESULTING HORIZONTAL CEP -- METERS | 5.3 | 1.6 |

ASSUMES HORIZONTAL DILUTION OF PRECISION EQUAL TO 1.5

FIGURE 3. GPS RELATIVE FRAME ACCURACY

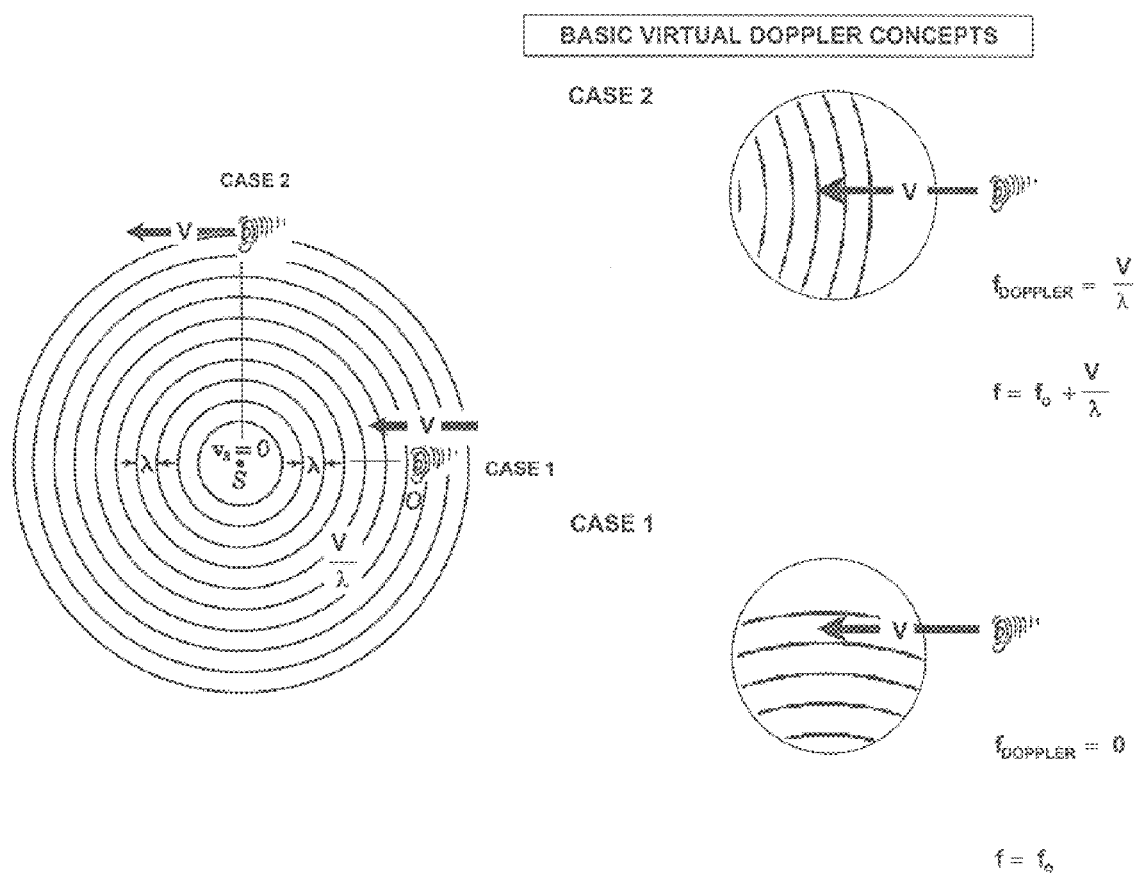
FIGURE 4. BASIC DOPPLER CONCEPT

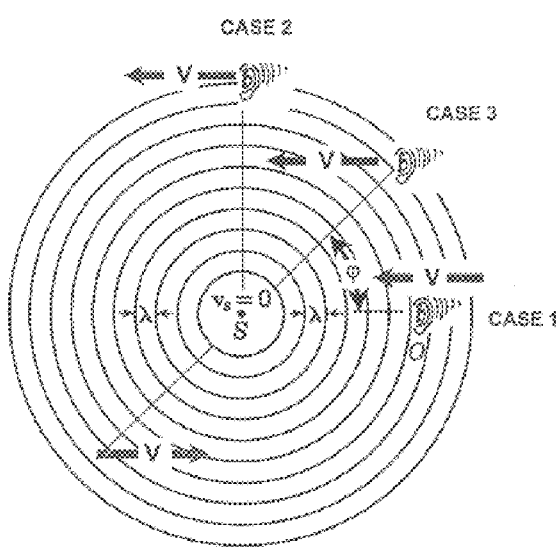
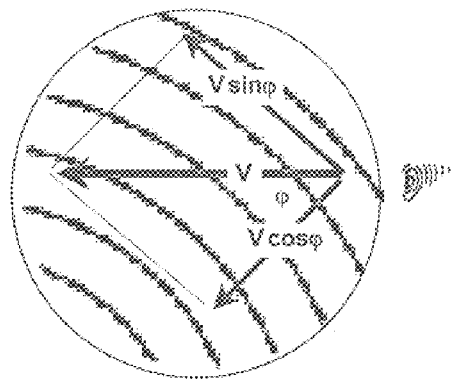
FIGURE 5. GENERAL CASE DOPPLER CONCEPT

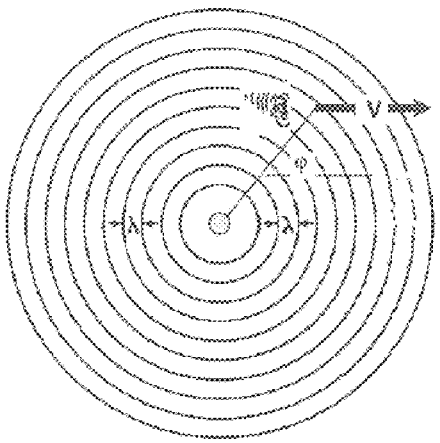

BASIC VIRTUAL DOPPLER CONCEPT

$$f = f_o - \frac{V\cos\varphi}{\lambda}$$

$$f = f_o - f_o \frac{V\cos\varphi}{c}$$

$$f = f_o \left[1 - \frac{V}{c}\cos\varphi\right]$$

THEORY OF RELATIVITY DOPPLER PREDICTION

$$f = f_o \frac{1 - \frac{V}{c}\cos\varphi}{\sqrt{1 - \left(\frac{V}{c}\cos\varphi\right)^2}}$$

$$f = f_o \left[1 - \frac{V}{c}\cos\varphi + \frac{1}{2}\left(\frac{V}{c}\cos\varphi\right)^2 + \ldots\right]$$

FIGURE 6. NEGATIVE – POSITIVE DOPPLER CONCEPT

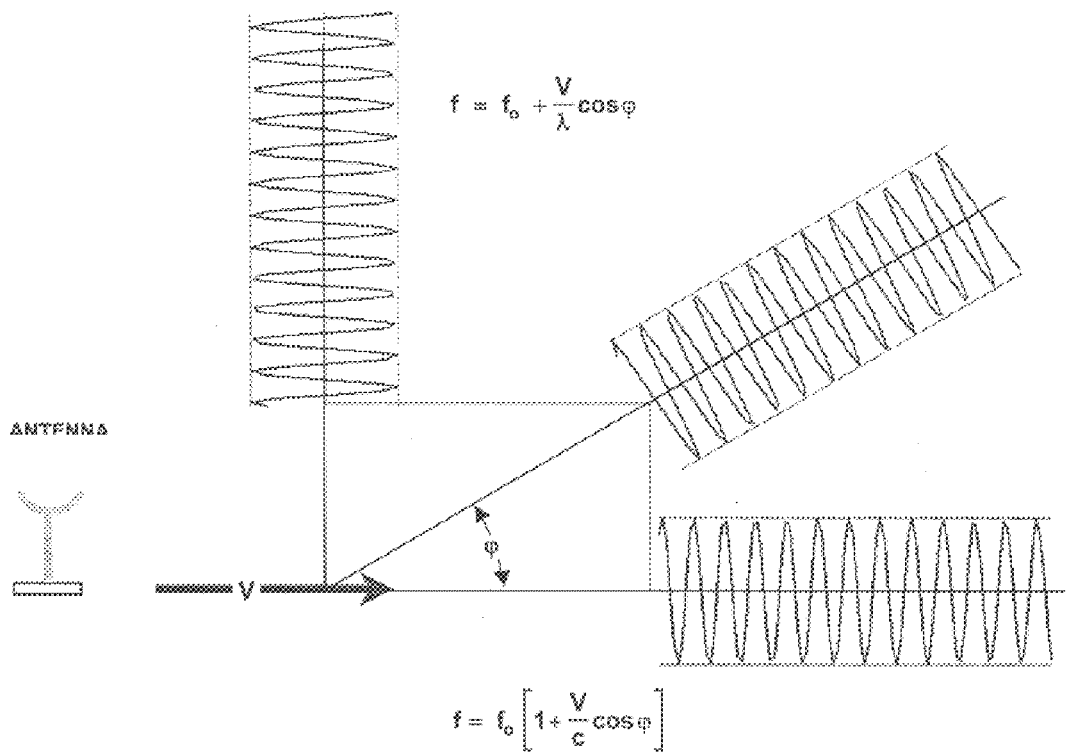
FIGURE 7. GENERALIZED DOPPLER SHIFT

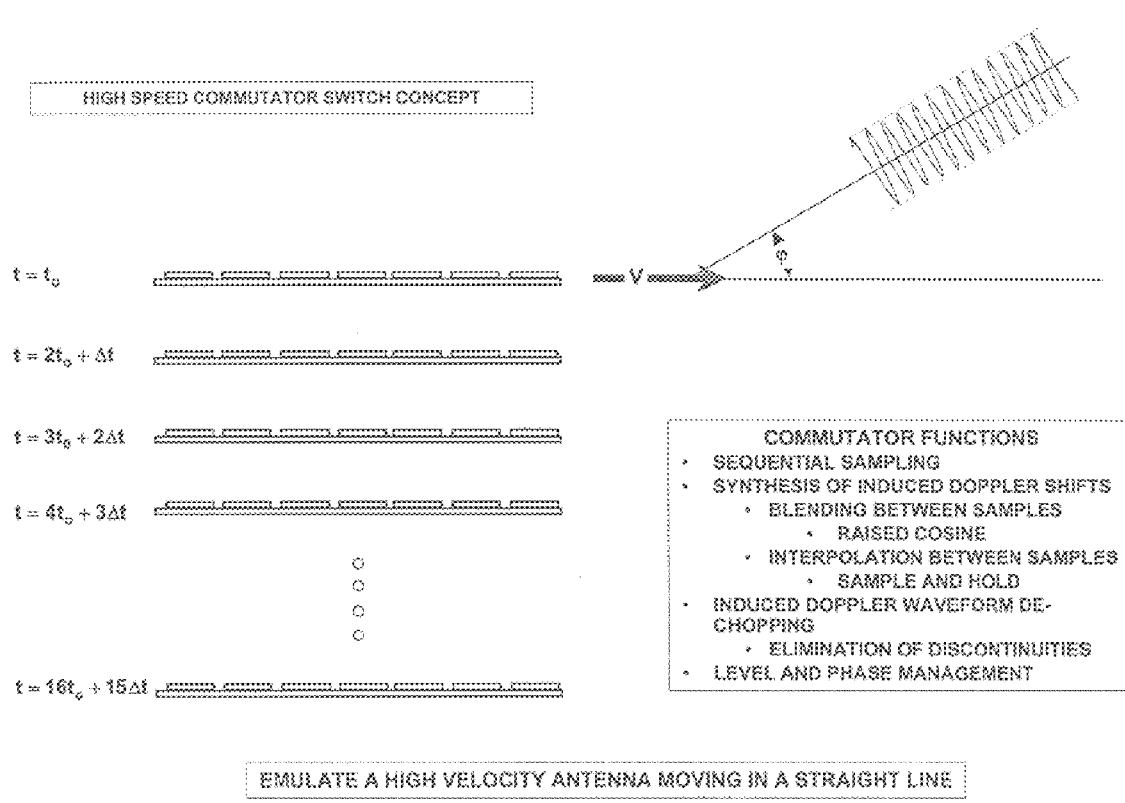
FIGURE 8. VIRTUAL DOPPLER CONCEPT

SIGNAL MODEL
- 10 GHz SIGNAL
  - UNIT AMPLITUDE
- 35 DEGREES INCIDENT ANGLE
- 11 ELEMENT ANTENNA
  - 0.5 CM SPACING
- 25 PICO-SECOND STEPS
  - 40 GHz SAMPLE RATE

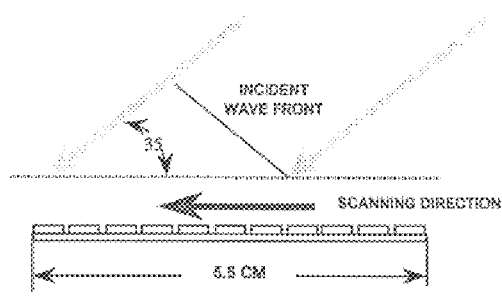

IN PHASE AND QUADRATURE PHASE FUNCTIONS FOR THE SPACE TIME SIGNAL MODEL $$S_c(x,f,\phi,\psi,A,t) := A \cdot \cos\left(\frac{2\pi \cdot f}{c} x \cdot \cos(\psi) - 2\pi \cdot f \cdot t + \phi\right) \qquad S_s(x,f,\phi,\psi,A,t) := A \cdot \sin\left(\frac{2\pi \cdot f}{c} x \cdot \cos(\psi) - 2\pi \cdot f \cdot t + \phi\right)$$

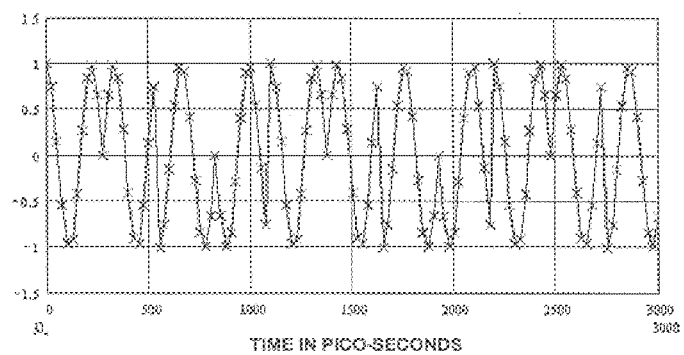

FIGURE 9. SIGNAL MODEL

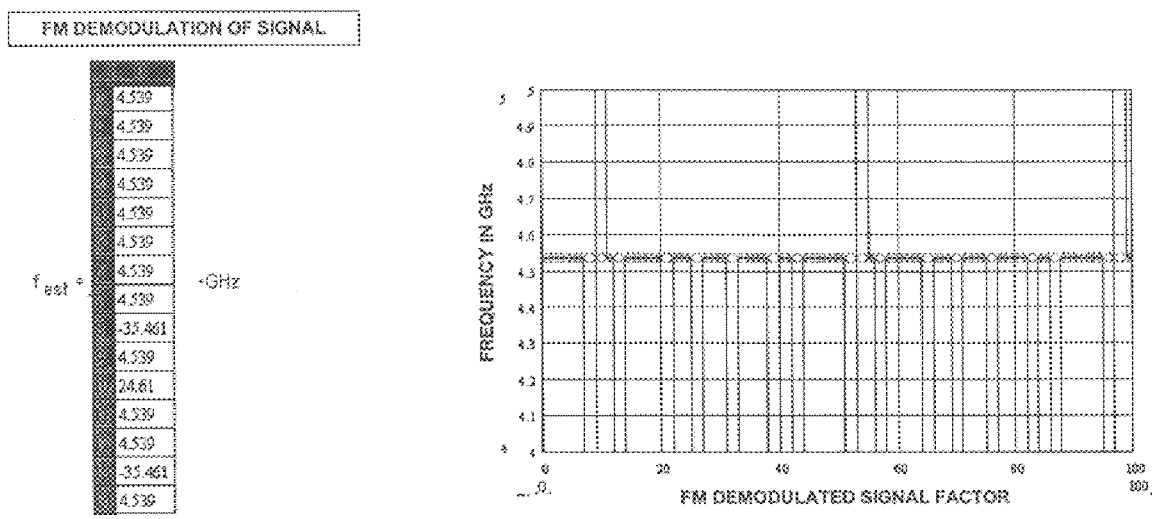
FIGURE 10. DOPPLER FREQUENCY

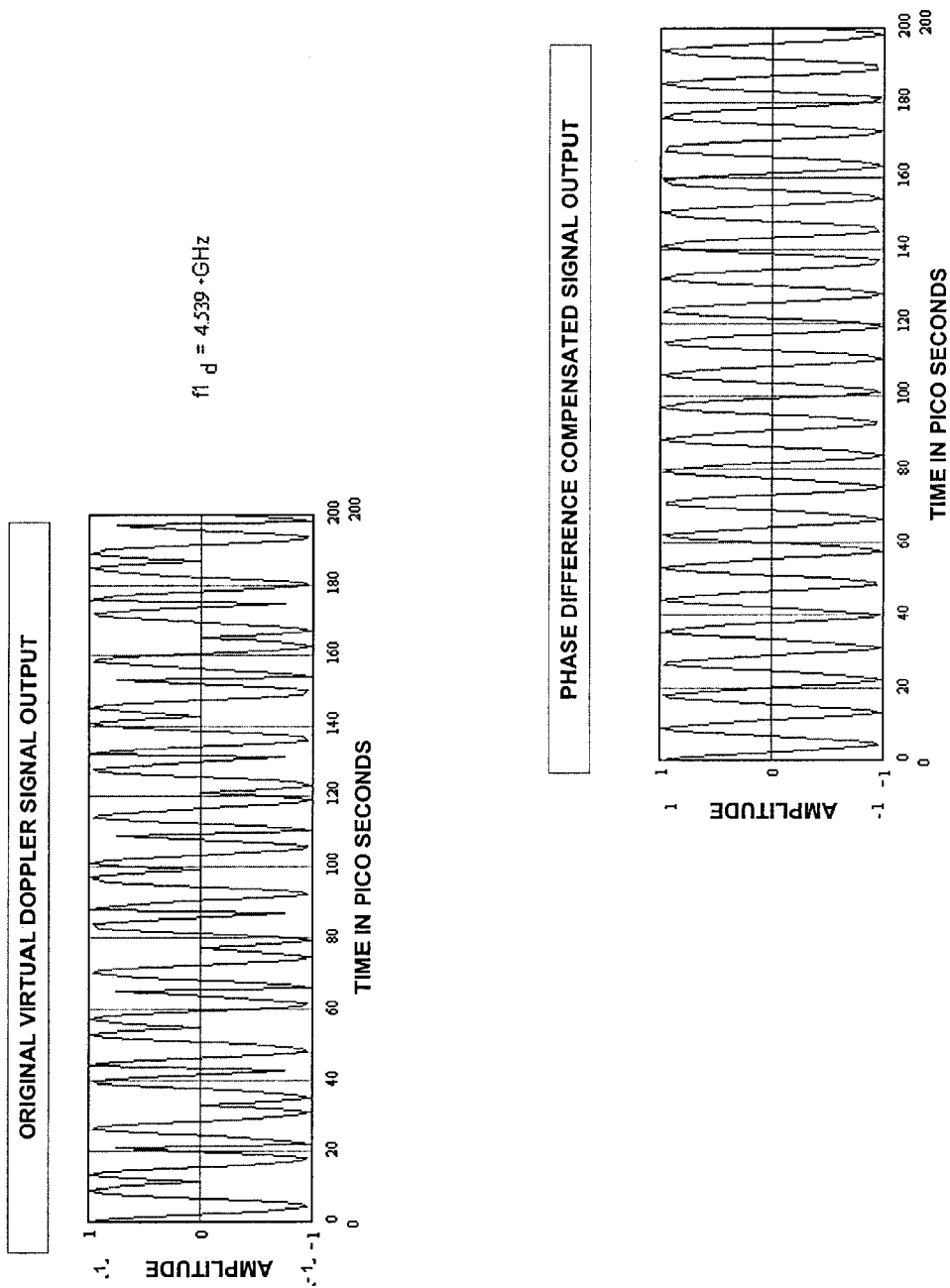
FIGURE 11. DISCONTINUITY COMPENSATION

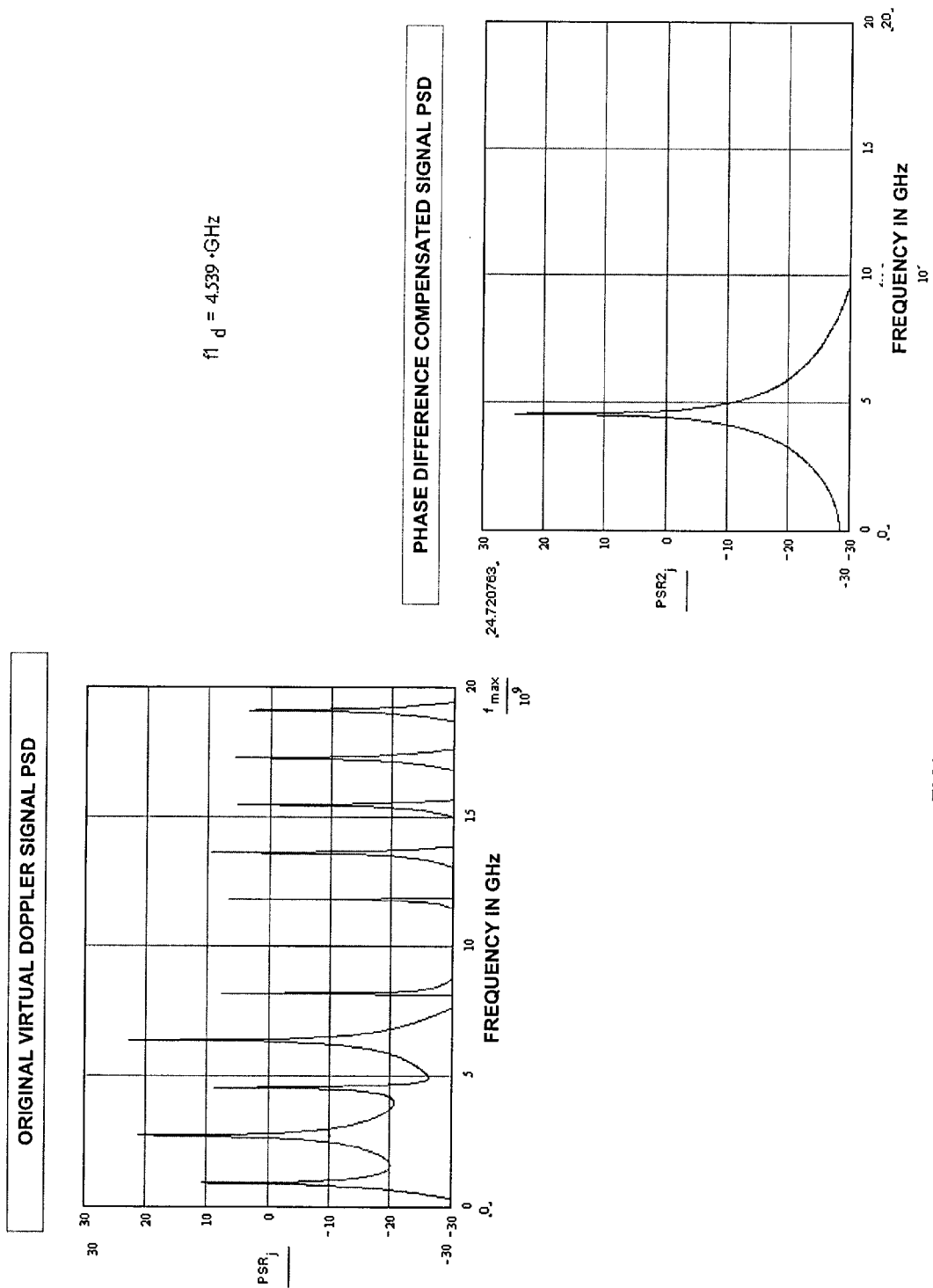
FIGURE 12. PSD COMPARISON

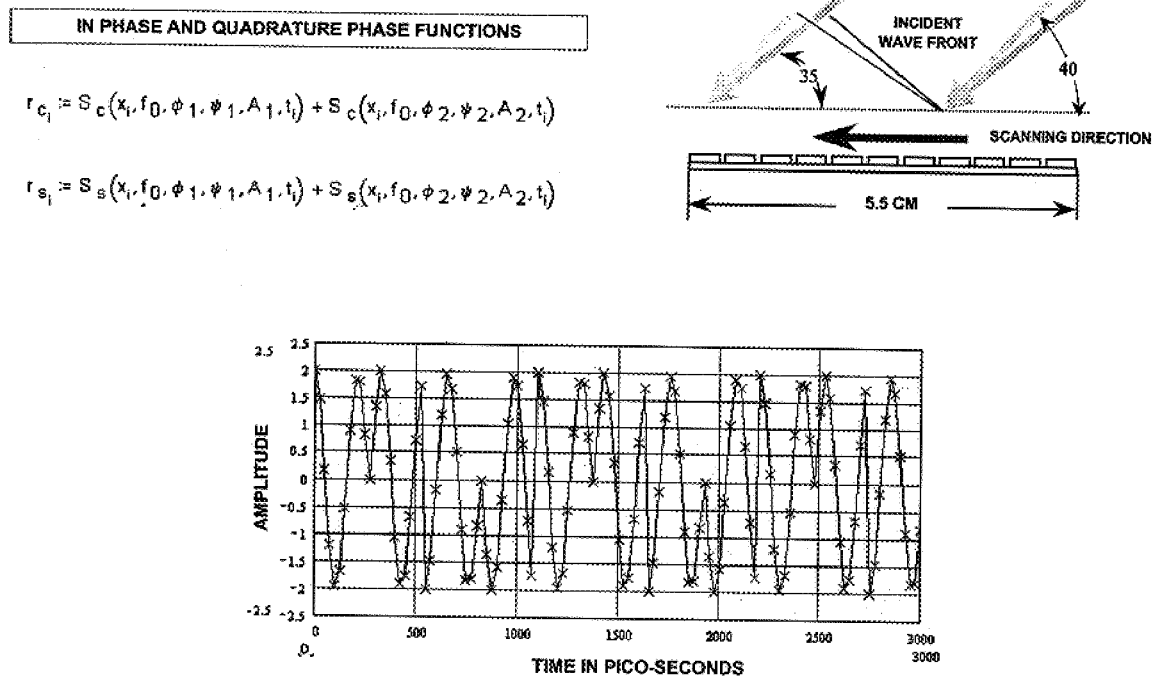
FIGURE 13. TWO SIGNAL MODEL

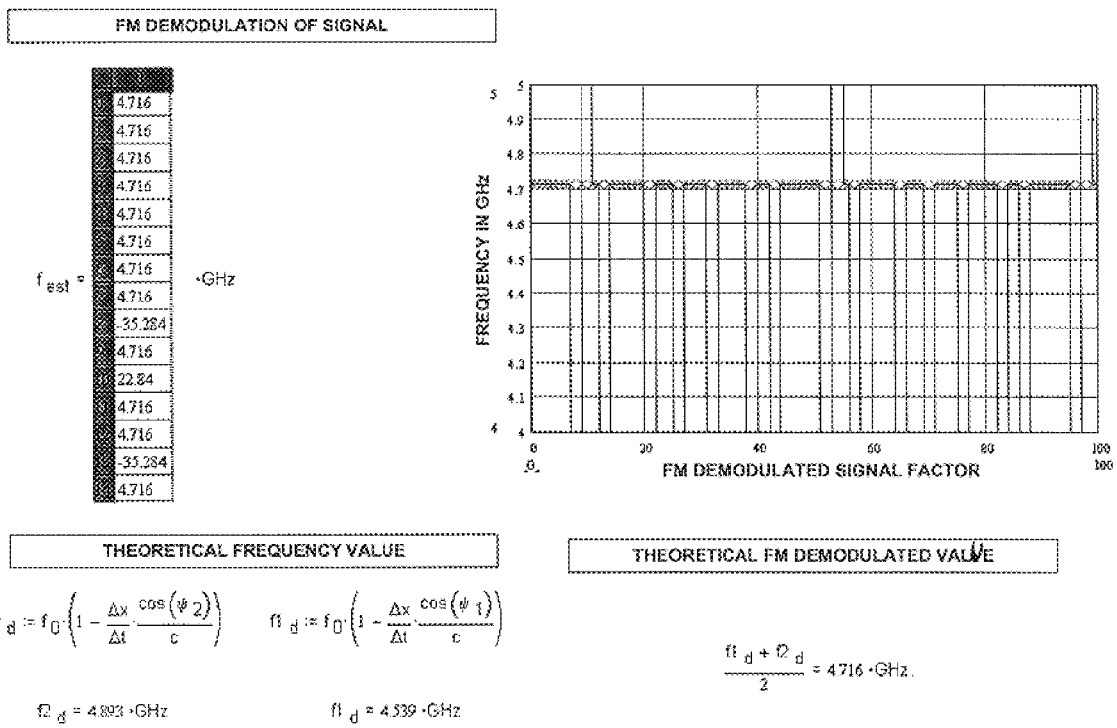
FIGURE 14. DOPPLER FREQUENCY

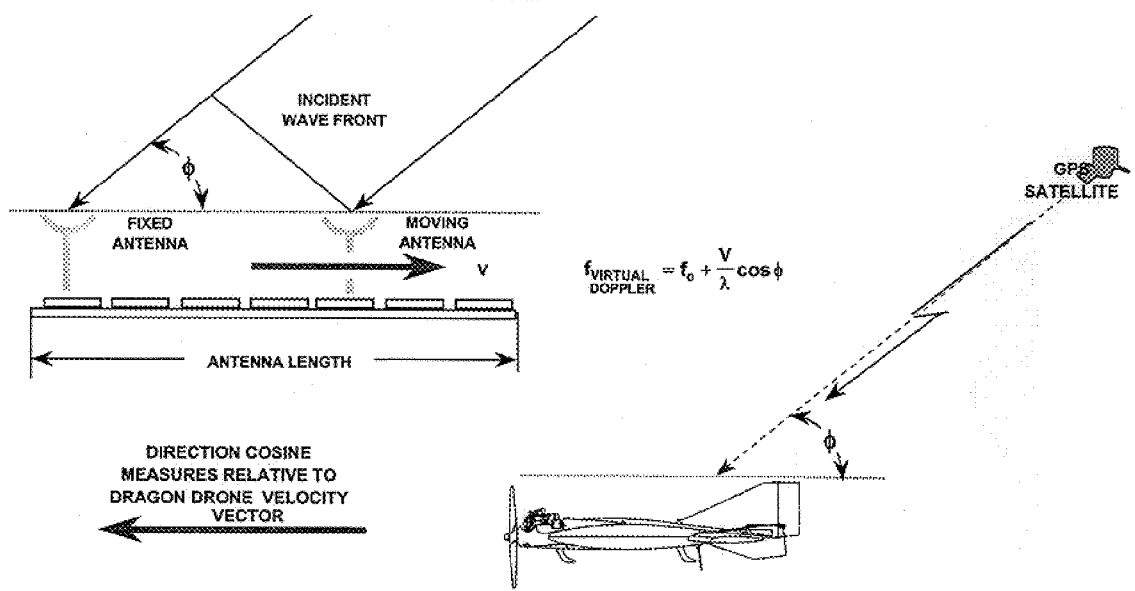
FIGURE 15. GPS PROCESSING CONCEPT

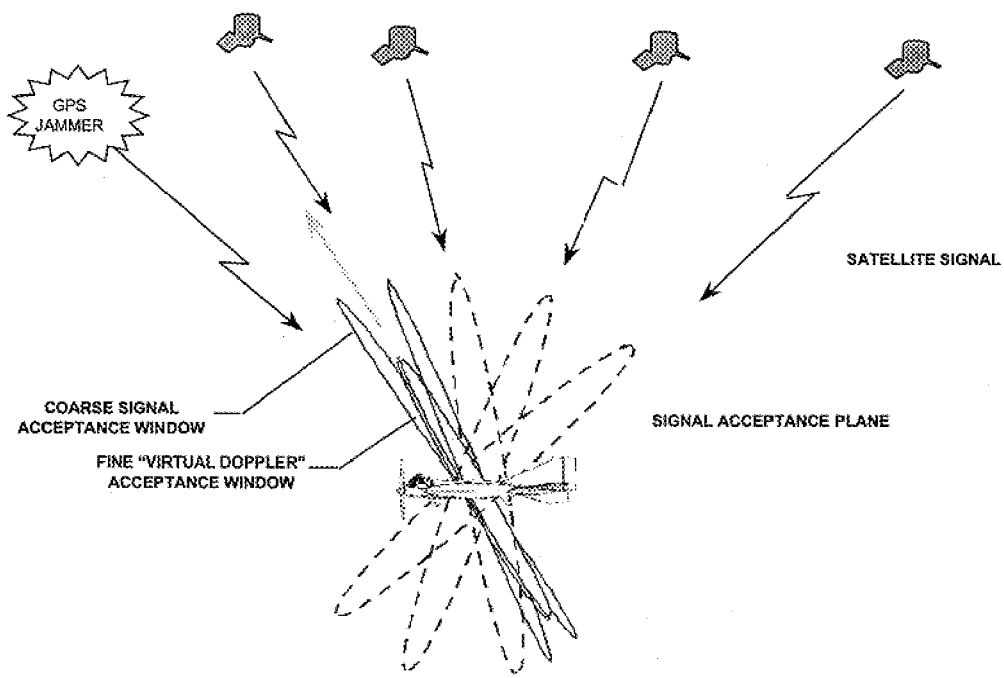
Figure 17. VIRTUAL DOPPLER GPS ECCM

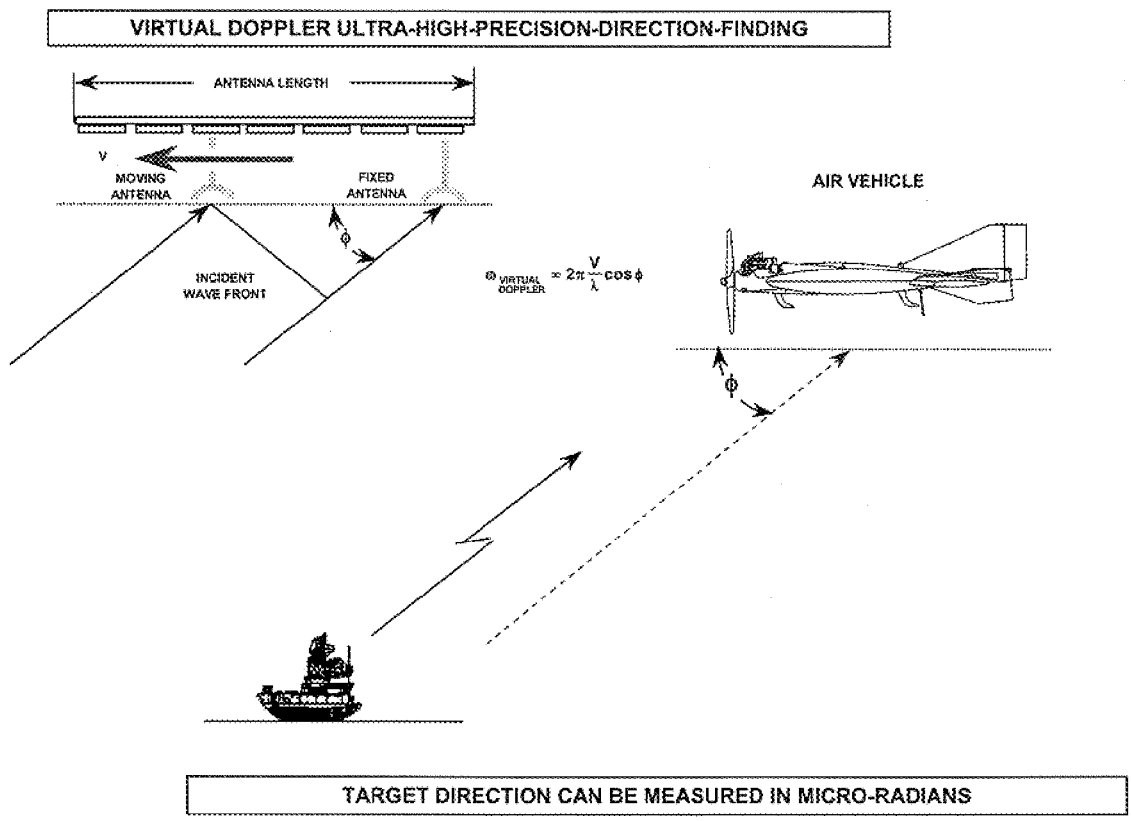
FIGURE 18. ULTRA-HIGH-PRECISION-DIRECTION-FINDING

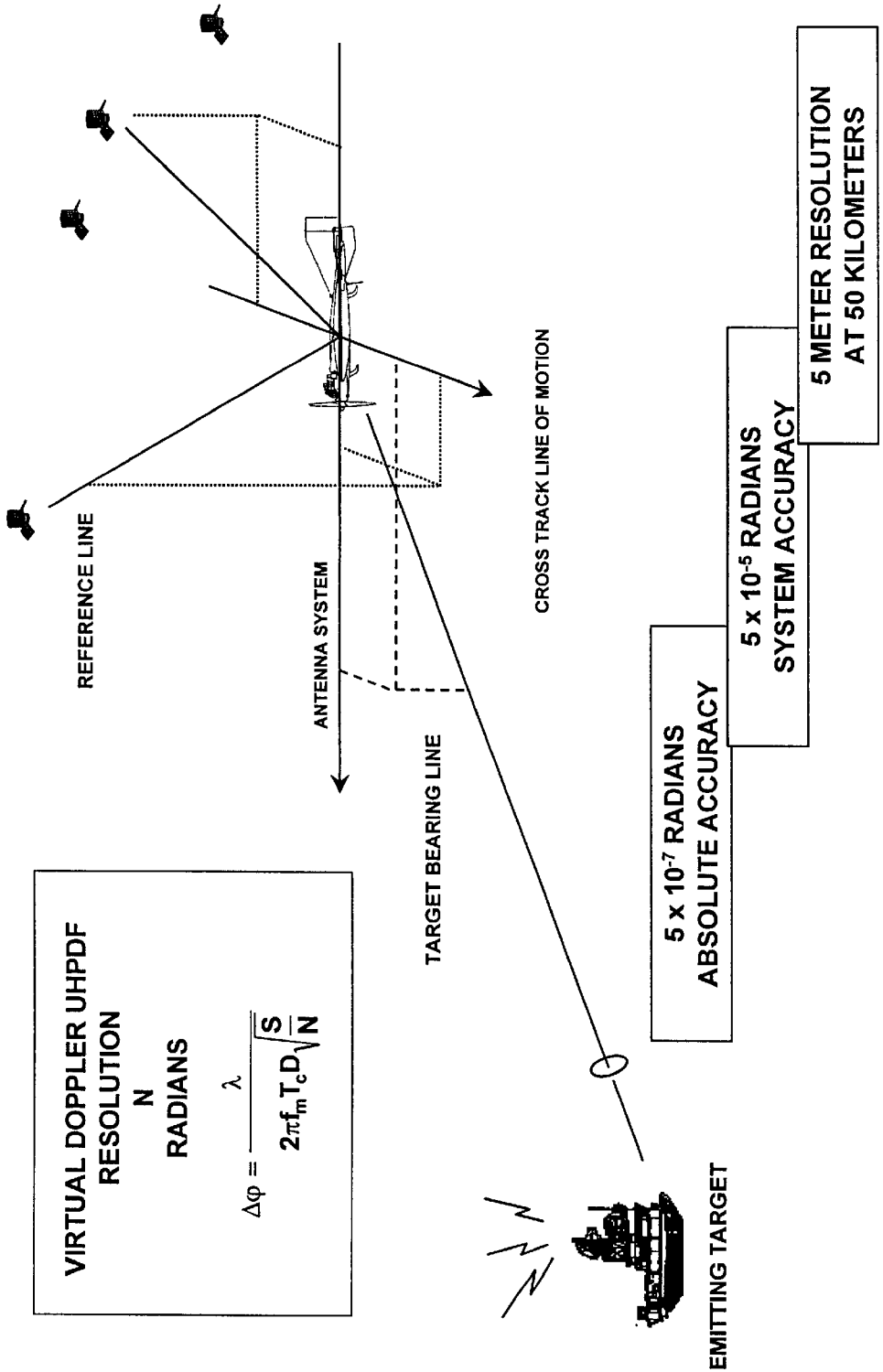
FIGURE 19. INSTANTANEOUS MEASUREMENT

TOP VIEW WITH GPS ANTENNA

BOTTOM VIEW WITH UHPDF ANTENNA

VIRTUAL DOPPLER UHPDF MEASUREMENTS MADE RELATIVE TO GPS SATELLITE BEARING LINES

VIRTUAL DOPPLER RESOLUTION

RMS ERROR IN COS(AOA) = $\dfrac{1}{2\pi\left[\dfrac{V}{\lambda}\right]T_c}\sqrt{\dfrac{S}{N}}$

PHASE DIFFERENCE INTERFEROMETER RESOLUTION

RMS ERROR IN COS(AOA) = $\dfrac{1}{2\pi\left[\dfrac{D}{\lambda}\right]}\sqrt{\dfrac{S}{N}}$

- SINCE $V/\lambda$ CAN BE MADE MUCH GREATER THAN $D/\lambda$, MUCH GREATER RESOLUTION IN THE MEASUREMENT OF COS(AOA) IS POSSIBLE WITH VIRTUAL DOPPLER THAN WITH PDI OF THE SAME BASELINE D AS THE LENGTH OF THE COMMUTATED VIRTUAL DOPPLER ARRAY OR THAN IS INDICATED BY RAYLEIGH'S DIFFRACTION LIMIT FOR A LINE APERTURE OF LENGTH D.

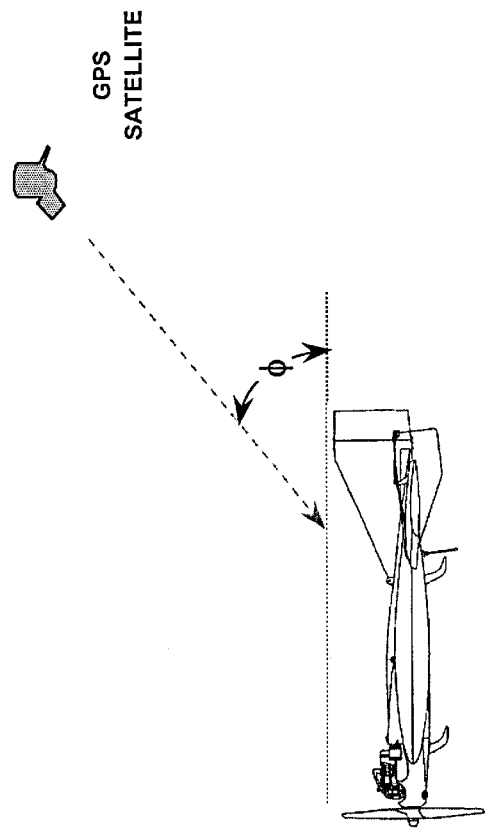

FIGURE 23. RESOLUTION

LOCATION OF THE RADIO FREQUENCY EMITTING TARGETS

BACKGROUND OF THE INVENTION

This invention relates to the precision direction finding of radio frequency emitting targets, typically a surface-to-air missile launching platform, and more particularly to an improved means and method for the rapid location of the target in terms of GPS coordinates of the target by its transmission from a single airborne platform for use by the platform or relay to other aircraft to allow engagement of the target with GPS guided weapons.

The ability to quickly locate a surface-to-air missile system and attack that system in a "sure kill" lethal suppression of enemy air defense capability is a combat task of high priority. Increased mobility surface-to-air missile systems, able to position, engage, and fire at an airborne target and quickly move from the location in which a missile is discharged have placed added emphasis on the ability to quickly locate and engage these surface-to-air missile system targets before they can move. Current methods employing phase difference interferometry in an anti-radiation signal processing scheme, are limited in their ability to engage these targets.

The current primary suppression of enemy air defense concepts employing AGM-88 high speed computer guided anti-radiation missiles [HARM} have several shortfalls, including:

a) difficulty in logistically supporting the HARM system;
b) limited automatic or automated mission planning capability;
c) difficulty in simulating decoys and saturating enemy threat radars without putting friendly forces in danger;
d) limited ability to reactively target surface-to-air threats; and
e) limited ability to employ off-board targeting sources in a timely way to provide accurate location of the target in a GPS ground grid. This is particularly true when these off-board sources locate mobile surface-to-air missile systems targets.

The most significant limitation of the current suppression of enemy air defense weapons is that they all depend on RF homing for guidance, and are vulnerable to enemy emission control counter measure tactics. The standard defense employed by the enemy is to cease its RF target acquisition, and track radar active emissions, or to "shut down" to avoid engagement. These include both tactics associated with a single missile launch site, as well as netted emission control concepts. The angular resolution of the anti-radiation phase difference interferometer on the HARM is insufficient to determine the location of the target with sufficient accuracy to allow the target to be engaged by a GPS guided missile such as a modified HARM or a dedicated GPS guided weapon as part of the engagement sequence using anti-radiation homing phase difference interferometry.

Advanced tactical targeting concepts are focused on the use of multiple air vehicles operating in triangulation modes with communication, via data links, between the various air vehicles and a ground or airborne controller, to enable a remitting target to be located with a high degree of accuracy in the GPS grid. This concept, because of the number of air vehicles involved, and the large number of data links required, as well as the need for a station controller used to monitor these data links, is extremely expensive and complicated to implement. It is usually associated with significant operations deficiencies related to the complexity of the approach.

Thus, a technique is required which includes allowing a single air vehicle, such as an unmanned air vehicle or "UAV", for example, to incorporate ultra high precision direction-finding capabilities. This technique would enable a single UAV to locate emitting targets in the GPS coordinate system within a very short time, typically in less than a second, after the emitting target has come up on-line and commenced to broadcast. Typically, such vehicle could be a Dragon Drone now in use by the Navy Marine Corp. (FIG. 1).

GPS-updated inertially guided weapons have the ability to engage targets located in the GPS grid to an accuracy of, typically, five meters, or better, to use this unique satellite guidance concept, it is necessary to locate the target in the GPS grid to an accuracy of the same order from platforms located at ranges as great as fifty kilometers from the target. Currently, no known techniques are available to do this.

SUMMARY OF THE INVENTION

Briefly stated, the invention enables the location of emitting ground targets in the GPS coordinate system with high precision by measuring the angle, angle direction to the ground target relative to the angle, angle bearing from the air vehicle to the GPS satellites being employed for air vehicle navigation. It does so by processing the signals received from emitting ground targets, such as surface to air missile systems, and signals received from the GPS satellite being employed for air vehicle navigation in such a way to impress a Doppler frequency shift on the signals proportional to their direction cosine of arrival. This in turn enables the measurement of the bearing to the emitting ground target relative to the non-orthogonal coordinate system formed by the at least four, but as many as ten, GPS satellites being used to navigate the air vehicle. Knowing the position of the air vehicle in GPS coordinates and the angle, angle bearing to the emitting target allows the position of the emitting target to be determined in the local GPS grid map to a high accuracy in GPS latitude, longitude and elevation. The signal processing technique is also shown to have application in making the air vehicle GPS receiver immune to single and multiple GPS jammers by separating the GPS signals received by the air vehicle from the GPS satellites from the jammer signals based on their direction of arrival. it can accomplish this using the same processing logic to locate emitting ground targets by separating the GPS signals from jammer signals based on their direction of arrival. This is accomplished by knowing the Doppler frequency shifts associated with the GPS satellite signals and using these frequencies to separate the jammer signals which have different Doppler frequency shifts since they have different directions of arrival than the GPS satellite signals.

BRIEF DESCRIPTION OF THE DRAWINGS

FIG. 1 is a schematic view showing the virtual Doppler concepts incorporated in the disclosed embodiment.

FIG. 2 is a schematic view illustrating the guidance of an unmanned aircraft using GPS position and velocity states only.

FIG. 3 is a chart illustrating the accuracy of the disclosed system in terms of standard GPS and relative frame GPS.

FIG. 4 is a schematic view illustrating known basic Doppler concepts.

FIG. 5 is a further schematic view illustrating general case Doppler concept.

FIG. 6 is a diagram illustrating the basic virtual Doppler concept in accordance with the disclosed invention.

FIG. 7 is a schematic diagram illustrating the need for high antenna velocities necessary to obtain reasonable virtual Doppler frequency shifts.

FIG. 8 is a schematic view illustrating the operation of a high speed sequential switch forming part of the disclosed embodiment.

FIG. 9 is a graphic illustration of a signal model in accordance with the invention.

FIG. 10 is a graphic view illustrating theoretical frequency value.

FIG. 11 is a graphic illustration showing original virtual Doppler signal output compared to phase difference compensated signal output.

FIG. 12 is a graphic illustration comparing original virtual Doppler signal PSD with phase difference compensated signal PSD.

FIG. 13 is a graphic illustration showing a two-signal model.

FIG. 14 is a graphic illustration comparing theoretical frequency value with theoretical FM demodulated value.

FIG. 15 is a graphic view illustrating the reception of GPS satellite signals by measurement of the cosine of the angle of reception relative to a velocity vector of the receiving aircraft.

FIG. 17 is a graphic illustration showing improved signal discrimination by monitoring precision direction of arrival of signal.

FIG. 18 is a graphic illustration showing reception of signal from an emitting target and measuring the angle of reception relative to the velocity vector of the receiving aircraft.

FIG. 19 illustrates the instantaneous measurement of the target received signal in terms of radians.

FIG. 23 is a graphic illustration showing the improved resolution relative to measurement of angle of reception of a received signal using virtual Doppler shift.

DETAILED DESCRIPTION OF THE DISCLOSED EMBODIMENT

Virtual Doppler Signal Processing

Figure 16:
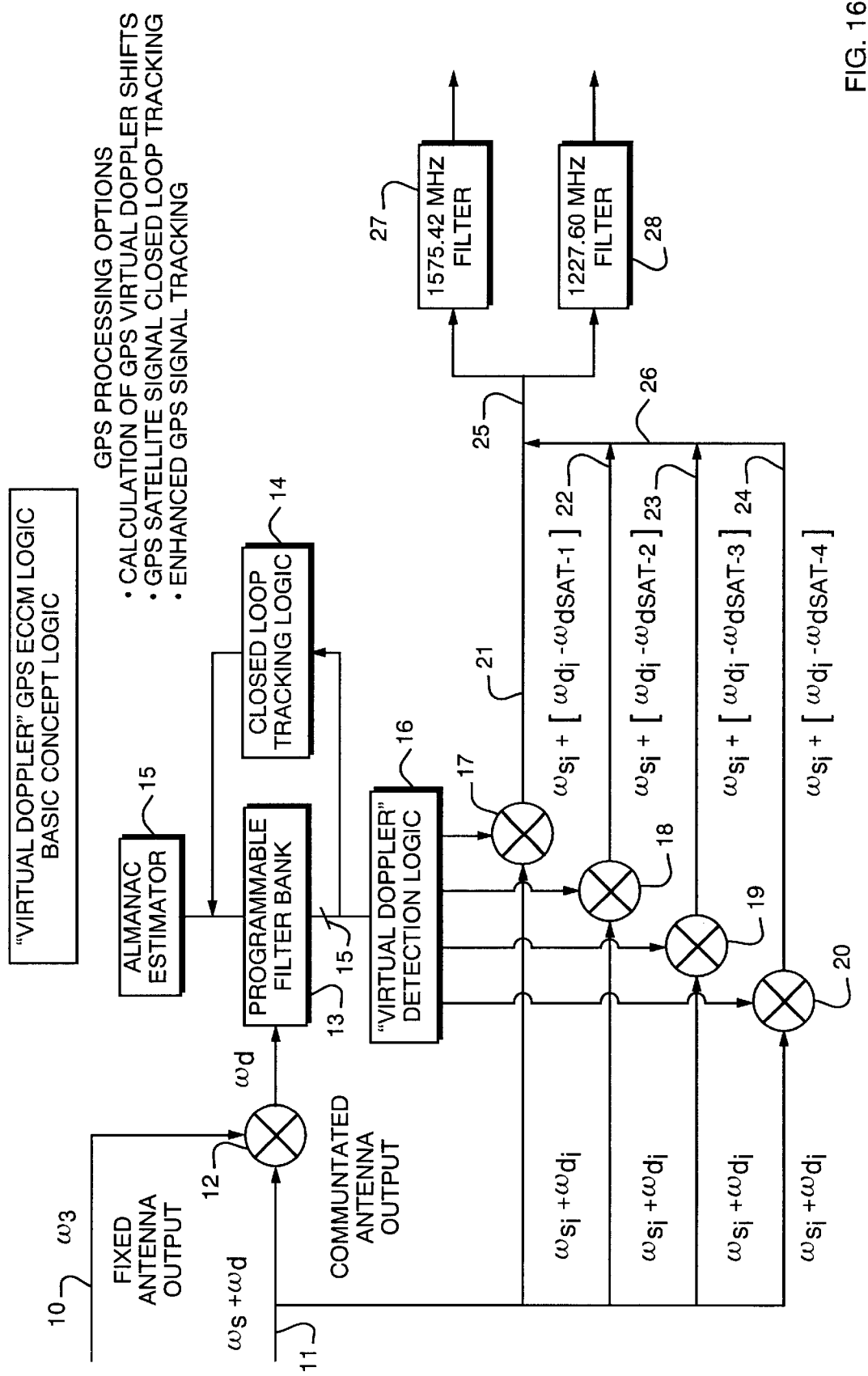
FIG. 16 is a block diagram showing GPS signal filtering logic.

As disclosed herein, virtual Doppler signal processing offers the potential of being able to locate emitting targets to an accuracy in the order of five meters, or better, from a range of fifty kilometers or less. The processing does so by determining the angle-angle bearing to the emitter to an accuracy of $10^{-5}$ to $10^{-7}$ radians, and referencing the orientation of the emitter to a non-orthogonal coordinate system formed from the lines between four satellites, at minimum, required to guide the air vehicle itself. This non-orthogonal coordinate system in stored digital form allows the target to be located in the GPS grid to a high accuracy in GPS coordinates. The disclosed virtual Doppler signal processing induces a Doppler shift on incoming signals to the platform antenna which are proportional to the direction cosine of arrival of the incoming signal. This high accuracy is accomplished by causing signals to be shifted in a virtual Doppler signal processing space by rapidly scanning the antenna.

The Virtual Doppler concept is based on fundamental physics familiar to the scientific community. It is well known that an individual moving toward a source which is acoustically radiating energy at a nominal frequency of $f_o$ will experience a Doppler frequency shift which is equal to the velocity of the observer divided by the wavelength of the source energy as illustrated in case 1 (FIG. 4). It is also well known that an observer traveling tangent to the source does not experience any Doppler shift and the apparent frequency of the source is its true frequency $f_o$. In the case where the observer moves directly at the radiating source, the apparent frequency is the sum of the source frequency, $f_o$, plus $V/\lambda$. Here V is the velocity of the observer. A more general case can be constructed by considering an observer moving at some arbitrary point at velocity V. (See FIG. 5, Case 2). In this case, using the concept discussed above, it is known that that portion of the velocity tangent to the radius between the observer and the source, having an effective velocity of Vsinϕ, induces no Doppler effect to the signal received by the observer moving relative to the source. On the other hand, the velocity component toward the source, Vcosϕ, would induce a Doppler shift on the source signal, as observed by the observer as in case 3, of $$\frac{V}{\lambda \cos\phi}.$$

The total frequency observed by the observer in case 3 would be $f_o + V/\lambda \cos\phi$ and would be an up Doppler or increase in frequency. In the same sense, if the observer were moving in the opposite direction, where the velocity vector v would be opposite to that discussed above, the observed frequency by the observer would be down-shifted in frequency $v/\lambda \cos\phi$.

These fundamental concepts form the basis of the disclosed Virtual Doppler method. In the case of RF energy, it is known that the wavelength of the signal from the source can be expressed in terms of the source frequency $F_o$ so that the Doppler frequency observed, in the case where the observer is moving away from the source, is equal to $f_o(1 - V/c \cos\phi)$. It should be noted that the theory of relativity, considering very high velocities for V, predicts a form that, if expanded in a Taylor series, includes terms similar to those associated with the fundamental definition of the Virtual Doppler concept.

In the following discussion, the higher order terms are neglected since, due to the signal velocity which is achievable by scanning an antenna at high speed, they are necessarily small compared to the velocity of light, c. (See FIG. 6). The generalized Doppler shift for an RF signal then traveling at a velocity V with an omnidirectional antenna toward the source is Doppler shifted by the quantity $v/\mu \cos\phi$ where $\cos\phi$ is the direction cosine of arrival of the incoming signal. V is the velocity at which the antenna is moving toward the source, with c the velocity of light. It is apparent at this point that in order to obtain reasonable Doppler shifts, very high antenna velocities are required. (See FIG. 7).

It is also obvious that velocities high enough to induce reasonable Doppler shifts are not achievable by an observer moving at a fixed velocity in space. Consequently, a Virtual Doppler concept has been developed. The Virtual Doppler concept involves sampling a linear antenna consisting of a fixed number of antenna elements separated in spatial distances less than λ/2 in sequence by a high known high speed switching logic or dr sequential switch (See FIG. 8). By switching from antenna element to antenna element in a very short time, the effect is to emulate an antenna that is moving relative to a supporting platform, even though it is not. The reasoning for this is that as the switching process occurs, the result is the same as if the antenna had actually moved to the next point that is being sampled by the high speed sequential switch.

The high speed switch or commutator does more than just sequentially sample. The sequential switch logic must also blend between samples using typically raised cosine or raised sign waves, or Gaussian functions, interpolate between samples while the switch is switching from one antenna element to the other following antenna element in a sample and hold detection logic, and synthesize the induced Doppler shifts. In addition, the commutator has to eliminate the discontinuities that are experienced when the switching process reaches the last antenna element in the linear array, and traverses back to the first element to start the scanning processing again. This discontinuity is present since, in general, it cannot be anticipated that an even number of wavelengths of the incoming signal will be across all of the antenna elements from front to back. In addition, the sequencing switch induces level and phase management techniques to enhance signal processing. In the simple sequential sampling of the linear antenna, the high velocity necessary to obtain Doppler shifts of an order of magnitude of ten percent or more, of the incoming signal frequency becomes possible. Since no moving parts are involved, the Doppler shift that is measured out of the sequential switch is referred to as a "Virtual Doppler" in based frequency shift.

The fact that this concept will induce a "Virtual Doppler" frequency shift has been demonstrated in a mathematical model in which a 10 GHz signal of unit amplitude was incident on an eleven-element antenna having a 0.5 cm spacing (See FIG. 9). The angle of incidence was thirty-five degrees. For the sake of the analysis, the signal was processed in phase and quadrature in a space time signal model. The sampling steps were twenty-five picoseconds and were generated at a 40 GHz sampling rate. Since the scanning direction was away from the source, in the example, it can be anticipated that induced Doppler would subtract from the 10 GHz frequency of the signal source in a down-Doppler shift into the Virtual Doppler signal processing space. The sampling process is at finite time points in the signal. As can be seen, there is a discontinuity that occurs at the eleventh sample due to the fact that an even number of wavelengths were not incident, in general, on the linear antenna elements. These sample points can be used to estimate the frequency in the virtual Doppler space as observed by an observer moving toward the source at twenty-five picosecond steps. This is equivalent to an observer moving at a Virtual Doppler velocity of $2 \times 10^6$ cm per second or 200,000 kilometers per second. The output of the sampling processing was then subjected to FM demodulation of the signal. The FM demodulation of the signal indicated that the resulting frequency from the commutator switch was 4.539 GHz (See FIG. 10). This is in substantial agreement with the theoretical frequency value which can be calculated using the equivalent form of the total Doppler frequency as derived above.

It is noted, as mentioned above, that at every eleventh sample, the discontinuity causes a unit step in the FM demodulated signal. This discontinuity is of no concern since it is known exactly where in the demodulation process it will occur. It will occur as the sampling process moves from the eleventh antenna element back to the first element. Consequently, it is eliminated from consideration by blanking that region and not considering any data from the commutator during that portion of the commutation process. In this case, the FM demodulated frequency would be a 4.539 GHz frequency, downshifted in the Virtual Doppler space from the source signal frequency of 10 GHz. The analysis indicates that the linear scanning of an array antenna with a high-speed commutator switch will induce a Doppler shift upon incoming signals which is proportional to their direction cosine, and the velocity at which the switch is traversed by the commutator process.

FIG. 11 illustrates the elimination of the discontinuity by knowing that it occurs at a predetermined point in the scanning process. A phase difference compensated signal output can then be created which appears to be a pure tone which is a Doppler shifted frequency in a Virtual Doppler space, either up or down from the source signal frequency by a magnitude which can be calculated with high precision. When this process is accomplished, and a power spectral density of the Virtual Doppler shifted signal prior to phase differencing compensation is compared to that which is compensated, it can be seen that the power spectral density can be constructed to contain a single frequency at the Doppler downshifted frequency in the Virtual Doppler signal processing domain of 4.539 GHz (See FIG. 12).

The fact that the signal processing mechanisms associated with multiple signals follows conventional mathematical formulas can be demonstrated by considering how the signals add to one another. The double angle formulas can be demonstrated to apply by considering two source signals, each incident upon the antenna that is scanned in a direction which moves away from the signal sources.

Two signals, each having a 10 GHz base frequency, were considered. One was incident upon the antenna at an angle of forty degrees, while the other was incident on the antenna at an angle of thirty-five degrees. All parameters were as discussed above (FIG. 13).

The output signal from the commutator appears similar to that which was observed before. There are discontinuities at the eleventh element in the scanning process as before. FM demodulation of the incoming signal indicates that the base frequency of 10 GHz was downshifted in the Doppler space to a total signal of 4.716 GHz. The calculation associated with the thirty-five degree signal indicates that it should add a frequency in the Virtual Doppler domain of 4.539 GHz as discussed above. A similar calculation suggests that the signal arriving at forty-degrees should have a frequency in the Virtual Doppler space of 4.893 GHz. Since there are two signals present, they would follow, subsequent to the FM demodulation, a double angle formula which states that the resulting observed signal would be the sum of the two signals divided by two or 4.716 GHz, which is exactly that frequency observed in the FM demodulation of the signal (See FIG. 14). Consequently, it can be concluded that the Virtual Doppler signal processing space will handle signals by the same means as if they were not shifted, and that the double angle formulas and other techniques of manipulating signals can be applied.

As will be seen below, it will be necessary to define a coordinate system in which the angle-angle bearing of the emitting target can be determined with high accuracy. This coordinate system will consist of the non-orthogonal set of axes defined between a GPS satellite and the airborne vehicle. Since the GPS satellite position, in the earth-centered frame, is available through the ephemerides that the satellite broadcasts as part of its message content, the GPS position of the air vehicle is also known relative to the earth frame and can be converted, in turn, to an earth-centered frame allowing a minimum of four reference lines to be established. As many as ten GPS satellites can be employed in the navigation of the air vehicle using GPS processing. The non-orthogonal coordinate system could use up to ten bearing lines in its processing. The fact that the four reference lines to the minimum of four GPS satellites can be established, and their direction of arrival, measured in terms of calculated direction cosine, means that the Doppler shift on a GPS satellite signal processed by Virtual Doppler signal processing can be determined exactly beforehand, and the up-Doppler or down-Doppler frequency in the Virtual Doppler plane can be determined.

In the simplest case, the direction cosine could be measured relative to the air vehicle velocity vector, since the calculation is made on an instantaneous basis and the orientation of the air vehicle in terms of angle of attack in yaw, does not need to be determined. In the simplest case, the Virtual Doppler processing associated with GPS location and, as will be seen, GPS electronic counter-countermeasures against individual and multiple jammers, can be accomplished by considering the first element in the linear antenna element array as a fixed antenna providing information relative to all signals incident upon the antenna (See FIG. 15). The output of the commutator switch, emulating moving the antenna at velocity v, provides information on all signals incident upon the antenna, Doppler shifted in frequency an amount proportional to the scanning frequency, direction cosine of arrival and wavelength of the incoming signal.

The GPS signal filtering logic in its simplest form, heterodynes the output of the first fixed antenna element with the output of the sequential switch which yields all of the Doppler frequencies associated as signals incident upon the antenna (FIG. 16).

FIG. 16 is a block diagram which illustrates that part of the disclosure related to positioning the platform. A fixed antenna output 10 is obtained from the first element of the multi-element antenna. The commutated antenna output 11 is obtained from the commutator which scans the entire multi-element antenna. These signals are mixed at 12 and fed to a programmable filter bank 13 which is part of a closed loop tracking logic 14. The almanac estimator 15 also feeds the filter bank with information obtained from data storage. The output of the programmable filter bank 13 is fed to a virtual Doppler detection and storage logic 16 which feeds mixers 17, 18, 19, and 20 which form separate channels corresponding to the four GPS satellites from which signals are being obtained. These channels 21, 22, 23, and 24, are fed to narrow band filters 27 and 28, the output of which is fed to the data storage map on the platform.

The almanac data provided from the satellites enables a programmable filter bank to position filters at the Doppler frequencies associated with the four satellites, at minimum, employed to obtain GPS position and velocity information of the air vehicle. The output of the programmable filter bank is the four Doppler frequencies associated with the four satellites being employed for GPS guidance. These Doppler frequencies are heterodyned, individually, in four separate channels with the output of the commutator switch which consists of all of the signals incident upon the antenna, plus the Doppler shifts due to the scanning process associated with the Virtual Doppler processing. The result of this heterodyning process is that all of the signals incident upon the antenna are shifted in frequency by the difference between the Doppler frequency associated with the direction cosine of arrival of the GPS incident signals and the Doppler frequency associated with one of the GPS satellites. In the case where the signal is a GPS satellite signal, this difference is zero and the signal remaining is a GPS satellite signal which will pass narrow bandpass filters downstream of the heterodyning point. Each satellite is treated in a single channel.

In the case where a six-to-ten channel receiver(not shown) is employed to effect GPS guidance, each of the six to ten GPS satellites employed in the guidance process would be treated in a separate channel in the Virtual Doppler signal processing system. The process of determining the Doppler shifts associated with the GPS satellites is one in which the calculation of the Virtual Doppler shift associated with a satellite, based upon satellite ephemerid data and drone GPS position, is augmented in a closed loop tracking logic which tracks the GPS satellite Doppler shifts (FIG. 16). In this way, the enhanced GPS signal tracking logic determines the exact GPS signal Doppler shift in the Virtual Doppler space for each of the GPS satellites being employed to effect air vehicle guidance.

This process, as described, or variations of this process, can be used effectively to make the GPS receiver on the air vehicle "jam-proof" since the only signals which will pass the downstream filters of the Virtual Doppler processing are GPS satellite signals. Any GPS jammer, in the case of a single jammer, would be Doppler shifted, based upon its direction of arrival as determined by its direction cosine, to a different frequency in a Virtual Doppler space. It would be eliminated, since its Doppler shift would be different than that associated with a GPS satellite signals because its direction cosine would be different (FIG. 17). The Virtual Doppler GPS electronic countermeasure concept allows rejection of all ground-based GPS jammers, since their direction cosine can be used to reject all jammer signals in the lower hemisphere. The Virtual Doppler acceptance windows for GPS satellite information, in general, are different than that associated with any GPS jammer, and, consequently, the jammers are rejected. This technique allows rejection of multiple jammers as well. Using a single linear antenna, GPS acceptance planes can be established outside of which signals are rejected. As will be seen below, the process can be modified to include a perpendicular linear antenna or alternate form which allows both discrimination of the GPS satellite signals based on two direction cosines, orthogonal one to the other and, in turn, rejection of GPS jammers which have direction cosines outside of those associated with signals incident upon the antenna from a GPS satellite.

Figure 20A:
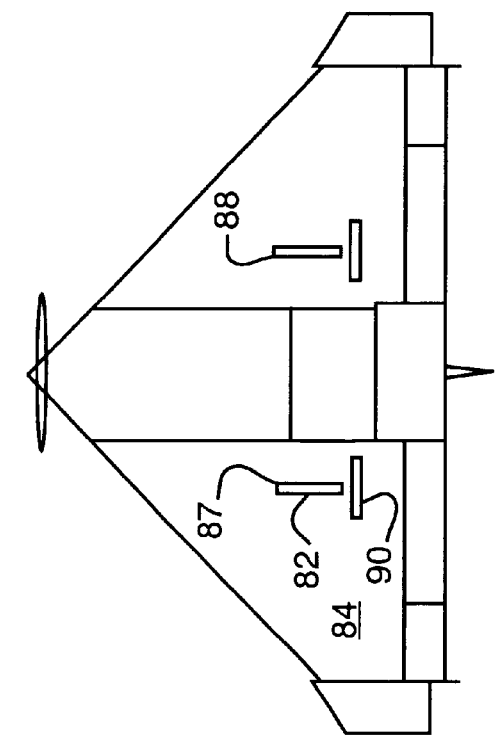
FIG. 20 is a schematic view illustrating the placement upon the receiving aircraft of GPS antenna and ultra high precision distance measuring antenna for receiving a target signal.
Figure 20B:
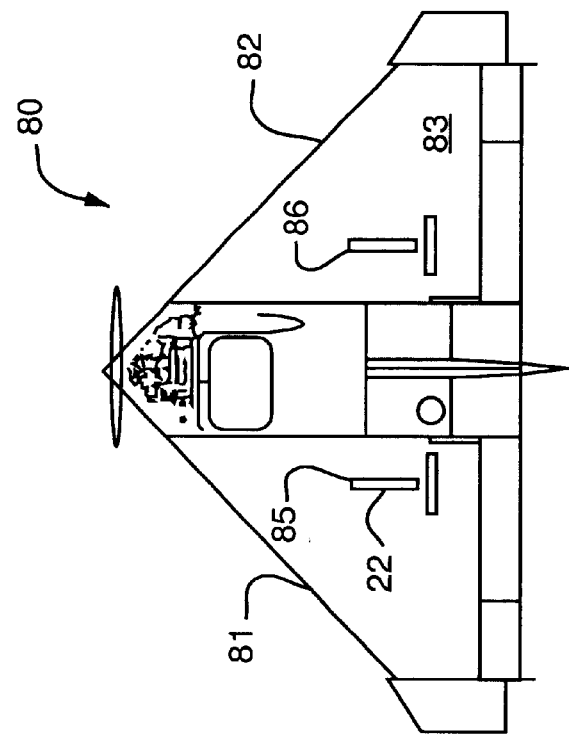

An emitting target location aspect of the invention involves the use of the Virtual Doppler direction finding of an emitting target, employing a method almost identical to that used to prevent GPS receivers from being jammed. In this case, however, the antenna is positioned on the bottom of the air vehicle (FIG. 18). A signal emitted from a surface-to-air missile system acquisition radar or track radar incident upon the antenna on the bottom of the air vehicle will result in a signal in the Virtual Doppler signal processing space shifted by Virtual Doppler frequency which is directly proportional to its direction of arrival as measured by its direction cosine relative to the velocity vector of the air vehicle. In the same sense, the first antenna element in the antenna array can be used as a fixed antenna that provides the radiating frequency of the surface-to-air missile system. The output of the commutated antenna, when compensated for discontinuities, as previously discussed, can be put into a frequency counter, in the simplest sense, to determine the Virtual Doppler frequency. This frequency consists of the source frequency plus the Virtual Doppler shift associated with the direction of arrival of the signal incident upon the antenna. Using conventional FM theory, it can be shown that the root mean squared error in the measurement of the direction cosine associated with the surface-to-air missile system emitter is $$\frac{1}{2f_m T_c \frac{D}{\lambda} \frac{S}{N}}$$

where $f_m$ is the number of times the antenna of length D is traversed per second, $T_c$ is the frequency interval, and S/N is the signal to noise ratio at the Virtual Doppler receiver. This error is extremely small. If the antenna is being scanned at a high rate, the principal characteristic of the Virtual Doppler concept, the root mean squared error in the measurement of the direction cosine can be shown to be on the order of $10^{-7}$ radians (See FIG. 19). Assuming that a range linear antenna element array is coupled with a cross-track linear antenna element array, the angle-angle bearing to the emitting target can be determined through a system accuracy of better than $10^{-5}$ radians (See FIG. 19). FIG. 20 illustrates a top view of the drone with GPS antenna, and a bottom view with ultra high precision direction finding antenna. This accuracy assumes that the signal-to-noise ratio is on the order of six for the incident incoming signal. The drone is equipped with a GPS ground truth map in the form of stored digital data, and using its own GPS position, and the angle-angle measurement to the surface-to-air missile system emitter, it can determine the GPS coordinates of the surface-to-air missile system to an accuracy on the order of five meters from a distance of fifty kilometers. This position cannot be improved since the GPS position of the drone, in general, has an associated error on the order of 3 to 5 meters. This five meter resolution at fifty kilometers is accomplished in the time it takes to determine the incoming emitter frequency and the Virtual Doppler frequency. This can be achieved essentially instantaneously, since the target is emitting at frequencies in the gigahertz range. Consequently, one second of emitting target incident signal processing provides more than enough information to determine the source frequency, as well as the Virtual Doppler frequency. The ultra high precision direction finding Virtual Doppler signal processing associated with emitting targets requires that the angle-angle bearing to the target be measured relative to a reference system which enables accuracies in the order of $10^{-5}$ radians to be preserved before referencing the angle-angle measurement to the GPS grid map.

The fundamental problem associated with this emitting target measure then becomes that associated with what reference measurement is made onboard the air vehicle. In general, UAVs and, for that matter fighter aircraft, do not have any onboard reference that is capable of this degree of accuracy. The solution to this problem lies in making the measurements relative to the bearing lines between the GPS satellites and the air vehicle using a non-orthogonal coordinate system consisting of, at a minimum, four coordinate axes, and at a maximum, up the ten coordinate axes for a ten-channel GPS receiver (See FIG. 21). The Doppler frequencies associated with the GPS satellites being employed to effect GPS guidance, as previously discussed, are available from the same Virtual Doppler GPS anti-jam logic which tracks these Doppler frequencies in a closed loop fashion.

Figure 22:
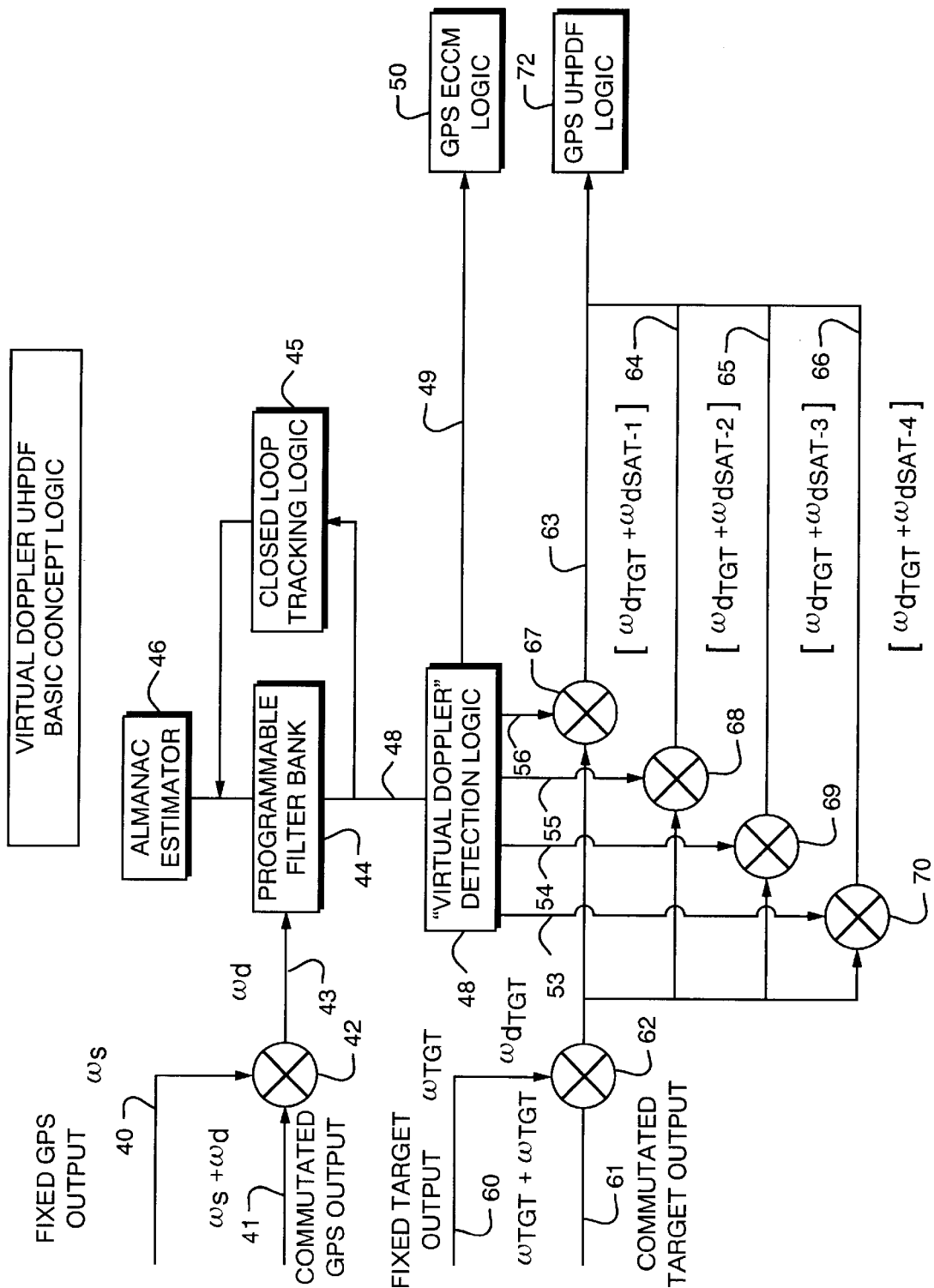
FIG. 22 is a block diagram showing the processing of received target signals using signal filtering logic.

Using the first elements on the linear array in range and cross-track of the antennas on the bottom of the aircraft as fixed antenna elements allows the frequency of the emitting target source to be determined (FIG. 22). It will be noted that the elements of the ultra high precision direction-finding logic resembles that shown in FIG. 16 with the substitution of GPS output compared to target output, and the substitution of GPS ECCM logic and GPS UHPD for the narrow band filters.

The means for ultra high precision direction-finding signal filtering logic is similar to that illustrated in FIG. 16. It includes a fixed GPS output 40, a commutated GPS output 41 fed to a mixer 42. The output 43 is fed to a programmable filter bank 44 forming part of a closed loop tracking logic 45. A similar almanac estimator 46 feeds the bank 44, and the output 47 is fed to a Virtual Doppler detection logic 48. The output of the logic 48 at 49 is fed to GPS ECCM logic 50.

For determining the target location, a fixed target output 60 is obtained from the first antenna element, while commutated target output 61 is obtained from the sequential switch. It is fed to a mixer 62 and to first, second, third, and fourth channels 63, 64, 65, and 66 which receive the outputs 53, 54, 55, and 56 from the detection and storage logic through mixers 67, 68, 69, and 70. The output of the channeled signals is fed to the GPS ultra high precision direction-finding logic 72.

This signal, when heterodyned with the output of the commutated signal, provides the Virtual Doppler frequency shift associated with the target. This signal, if heterodyned in individual channels associated with each of the Doppler shifts characterizing the GPS satellite, results in a Doppler shift which is the sum of the Doppler shift associated with the emitting target and the Doppler shift associated with the satellite in that channel. If the frequency of that signal is determined, in the simplest sense, by frequency counting, the direction cosine between the line from the GPS satellite to the UAV, and the line from the UAV to the emitting target, in one dimension, can be determined with great precision. This process is accomplished in the range antenna, one of the angles to the target being determined in a non-orthogonal coordinate system. The same processing in the cross-track antenna allows the second angle bearing to the target to be determined with equal precision. The process is implemented simply by converting the GPS position measurements of the air vehicle to earth-centered frame measurements that are, in turn, combined to determine the angles between the four satellite coordinate axes and the bearing line to the target. Since the air vehicle has a GPS grid map, the GPS position of the air vehicle, the angle-angle bearing to the target, and the GPS grid map enables the air vehicle to determine the location of the emitting target in the GPS grid. The accuracy of this measurement, as previously mentioned, is inversely proportional to the signal-to-noise ratio of the signal received from the emitting target. In those cases where the air vehicle is located in the main beam of either the acquisition radar or track radar of the surface-to-air missile system, the air vehicle can determine the location of the emitting target from a single air vehicle in a matter of seconds. In the case where the variation from the emitting target is through the side lobes of the target, the accuracy of measurement will degrade because of the decrease in signal-to-noise ratio available.

Thus, the Virtual Doppler signal processing concepts described above offer two unique aspects, including:

a) providing the basis to eliminate GPS jamming from consideration in a GPS receiver. This approach, which can be defined to overlay GPS receivers, discriminates signals incident upon a linear antenna based on the direction cosine of those signals in range and cross-track, which allows the elimination of GPS single and multiple jammers through a selective filtering process based upon knowledge of the direction cosines associated with the satellites being employed for guidance.

b) In addition, there is provided a basis to effect ultra-high-precision finding by measuring the angle-angle to the target relative to the GPS satellite bearing lines, and combining this information with a GPS grid map and air vehicle GPS position to determine the target GPS longitude, latitude, and elevation position with high precision.

Both of these aspects represent a significant departure from conventional techniques previously known in the art, either in GPS anti-jam approaches and in precision direction finding. Prior art GPS anti-jam approaches in general, have focused on conventional antenna null management techniques to place an antenna null at the position of the jammer. This approach is limited to the number of jammers that can be defeated. The approach does not eliminate the jammers, it merely mitigates them. In addition, there is only a limited number of jammers, on the order of five to ten, which can be addressed, and when jammers become large in number, as in a netted GPS jamming technique, the approach fails.

Likewise, precision direction finding techniques based upon phase difference interferometry are also limited, since the RMS error and determining the direction cosine of an incident signal on the antenna is limited by the spacial separation of the antennas as determined by d/λ. (See FIG. 23). It is to be noted that the Virtual Doppler approach essentially is one which takes the static phase difference interferometry solution, which can be viewed as being a solution associated with position space, and converting it to a velocity space measurement. Since the v/λ term and the Virtual Doppler approach can be made much greater than d/λ, by increasing the velocity of the commutation process, the resolution of the approach is significantly greater than that achievable by phase difference interferometry. Virtual Doppler is based on a wide band beam/beam spreading frequency modulation by use of the direction cosine of its signal. By contrast, phase difference interferometry is based upon propagation phase shifts as opposed to direction cosines. Virtual Doppler relies on a line array of antenna elements only to define a path of motion for synthesizing the output of a single moving antenna element moving at very high speed and providing a local reference for the angle of arrival of incident signals. By contrast, phase difference interferometry relies upon a line array of antenna elements only to define an aperture for synthesizing static special effects associated with aperture dimensions.

Virtual Doppler requires that the interspacing between array elements are set by the requirements of discreet time sampling of a hypothetically moving antenna position versus time. Phase difference interferometry requires the interspacing between the two outermost elements to define the desired aperture in the spacing between intermediate pairs of elements as set by requirements of resolving the ambiguities in the phase difference between the outermost elements of the antenna array. Virtual Doppler essentially trades bandwidth of induced FM in Doppler for direction cosine of arrival resolution, and to co-channel noise interference. Phase difference interferometry trades baseline aperture for incident signal direction of arrival resolution, and immunity to co-channel noise, but offers no protection against co-channel on-frequency interference.

DETAILED DESCRIPTION OF A PREFERRED EMBODIMENT OF THE INVENTION

Referring to FIG. 20, there is illustrated a known UAV vehicle, generally indicated by reference character 80. It is of flying wing type, including first and second wings 81 and 82 having movable control surfaces. Each wing includes an upper surface 83 and a lower surface 84. The upper surface mounts first and second GPS antennae 85 and 86. The lower surface 84 mounts first and second ultra high precision distance-finding antennae 87 and 88, each including a range section 89 and a cross-track section 90, as is known in the art.

Figure 21:
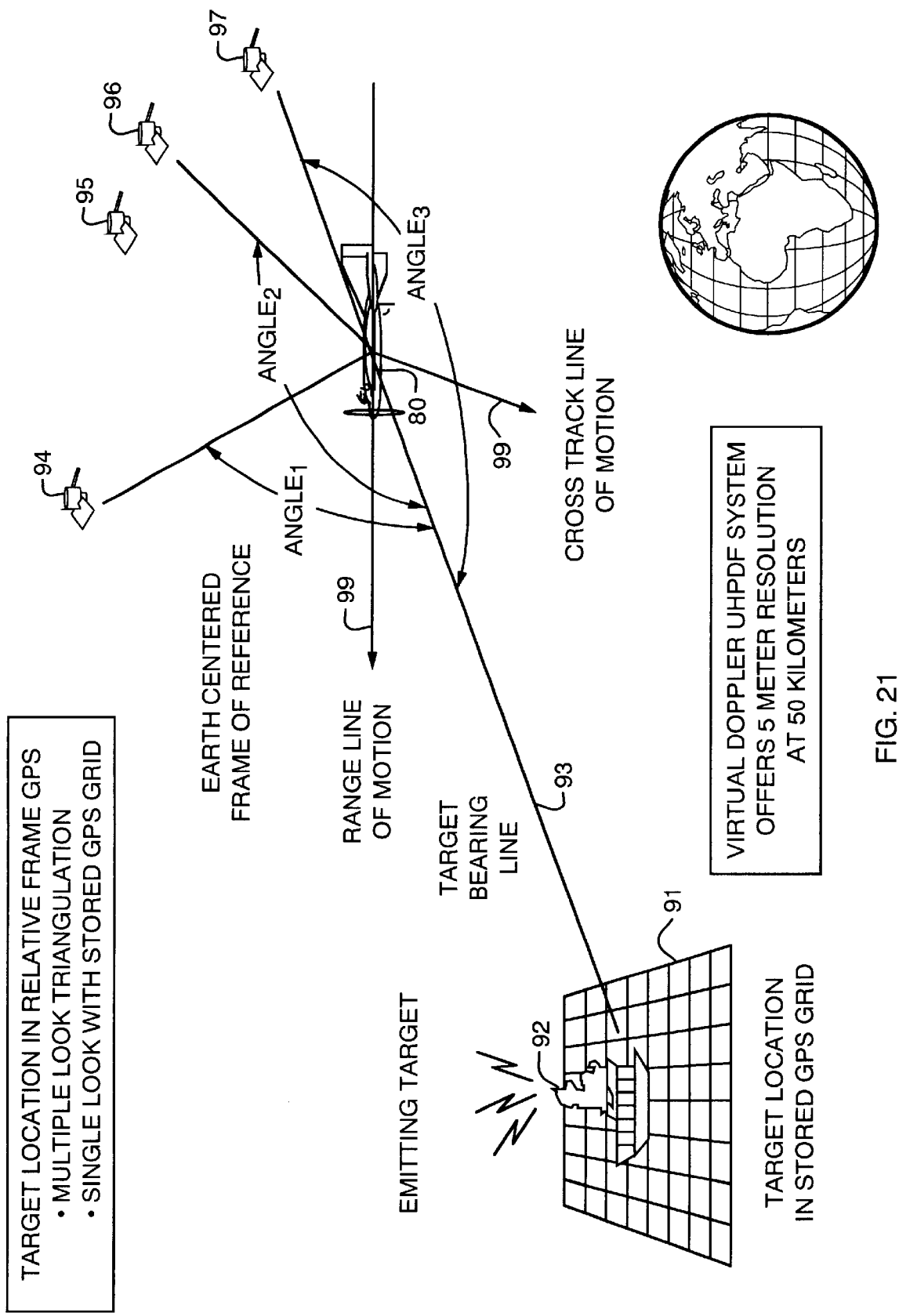
FIG. 21 is a graphic illustration showing target location in relative frame GPS based coordinates.

Referring to FIG. 21, the vehicle 80 is equipped with a stored GPS ground surface grid 91 upon which an emitting target 92 is ultimately positioned. The emitting target projects a target-bearing line 93 which is intercepted by the lower antennae of the vehicle 80.

Four satellites 94, 95, 96, and 97, or more, are employed to provide an earth-centered frame of reference embodied in the stored GPS grid. The target-bearing line is referenced with respect to the range line of motion 98, and the cross-track line of motion 99 to provide single look location or multiple look triangulation location. The cosine of the three angles between each of three satellites is employed to determine the degree of Doppler shift, not only of the GPS signals, but the signal along the target-bearing line as well.

What is claimed is:

1. A method of determining the direction of arrival of GPS satellite signals received by a GPS receiver on an airborne platform, including the steps of:
   a) determining the angle of incidence of received signals relative to a velocity vector or other reference of said platform;
   b) determining the cosine of the angle of incidence;
   c) determining the frequency of the received signals;
   d) Doppler shifting the determined frequency by a degree determined by the determined cosine angle;
   e) filtering said signals to reject unwanted signals;
   f) further processing said signals to determine the GPS position of the receiving platform in terms of position and velocity state data on a digital stored non-orthogonal map.

2. In the method set forth in claim 1, the additional steps of:
   g) providing a multi-element antenna including a first fixed antenna element and a commutator switch scanning said antenna element;
   h) providing a GPS filtering logic, and using the same to heterodyne the output of a first fixed antenna element with the output of the sequential switch to provide all of the Doppler frequencies associated with signals received on said first antenna element;
   i) providing a programmable filter bank;
   j) employing almanac data from received GPS signals to position said filter bank at Doppler frequencies associated with received satellite signals to obtain GPS and velocity information relative to said platform.

3. The method as set forth in claim 1, including the additional step of providing continuous closed loop tracking of received signals.

4. The method in accordance with claim 1 in conjunction with received GPS satellite ephemerides.

5. A method for determining the direction and elevation of arrival of a radio frequency received signal from an emitting target relative to a horizontally-oriented receiving platform having a digitally stored non-orthogonal grid, relative to said grid, comprising the steps of:
   a) receiving said signal using range and cross track antenna to determine bearing relative to a velocity vector of said platform;

b) frequency counting said signal;

c) determining the cosine angle of said bearing; and d) shifting the frequency of said signal in relation to the determined cosine angle, and e) filtering said frequency shifted signal to reject unwanted jamming signals.

6. The method of generating a Doppler frequency shift in a radio frequency received signal by an airborne platform proportional to the cosine angle of said received signal relative to said platform, comprising the steps of:

a) providing said airborne platform with a linear antenna array having a fixed number of antenna elements separated in spaced distance less than $\lambda/2$, where is equivalent to the longest wave length to be received;

b) providing a high speed commutating switch;

c) sequentially scanning the elements of said array at a speed sufficiently great to emulate movement of said antenna relative to said platform to obtain a usable Doppler shift;

d) blending between samples using any of received cosine waves, while switching from each antenna element to a succeeding antenna element using a sample and hold detection logic to synthesize an induced Doppler frequency shift.

7. The method set forth in claim 5, including the further step of eliminating discontinuities when scanning by said switch reaches a last antenna element and traverses back to a first antenna element.

8. The method set forth in claim 7, including the further step of creating a phase difference compensated signal which is of a Doppler shifted frequency compared to said received signal.

9. The method set forth in claim 7, including the further step of converting all received signals to baseboard frequency, and effecting virtual Doppler processing thereon in the associated frequency space.

10. A method for determining the direction cosine of an angle of incidence relative to signals received by an airborne platform having a stored digital non-orthogonal GPS map relative to a velocity vector of said platform comprising the steps of:

a) providing a linear antenna having a plurality of spaced antenna elements;

b) providing a sequential switch capable of scanning individual antenna elements in sequence at a rate equivalent to simulating movement of said antenna relative to said platform;

c) using a first element in the linear antenna as a fixed antenna to provide information relative to all signals incident upon the antenna; and d) using the output of said commutator switch to emulate movement of said antenna relative to said platform, and providing information on all signals incident upon said antenna shifted in frequency an amount proportional to the scanning direction cosine of arrival and wavelength of received signals.

11. The method in accordance with claim 10 including:

e) the steps of comparing signals from said antenna and said switch to obtain an average frequency Doppler signal; and f) filtering unwanted signals for further processing, including the locating of the source of received signals relative to said map.

12. Means for determining the instantaneous location of an emitting ground-based target in terms of earth-based GPS map coordinates comprising: an airborne platform having a digitally stored non-orthogonal ground truth map, said platform defining a velocity vector; said platform having a multi-element antenna array including a first elongated element and a plurality of elements parallel to said first element; commutator switch means for scanning said antenna array at a speed sufficient to simulate movement of said antenna array relative to said platform, said switch means generating a fixed GPS signal output and a commutated GPS output obtained by scanning said array; a programmable filter bank receiving a mixture of fixed GPS signals and commutated GPS signals; a Virtual Doppler detecting and storage logic element receiving an output from said filter bank; a GPS ECCM logic element receiving the output of said detection and storage logic element and determining the position of said platform in said map; said antenna array having range and cross-track components for determining the angle of incidence relative to a received signal, said detection and storage logic including means for determining the cosine of angle of incidence of a received signal and shifting the frequency of said signal by an amount proportional to the cosine of said angle of incidence; a second antenna array having range and cross-track components for receiving GPS signals, and determining the angle of incidence of said GPS signals; means for establishing the location of said platform in said map from received GPS signals; and means for determining the position of said target relative to the position of said platform.

* * * * *